Nov. 21, 1944.  H. L. GIBSON  2,363,409
FINE ADJUSTMENT MECHANISM
Filed June 11, 1942   2 Sheets-Sheet 2
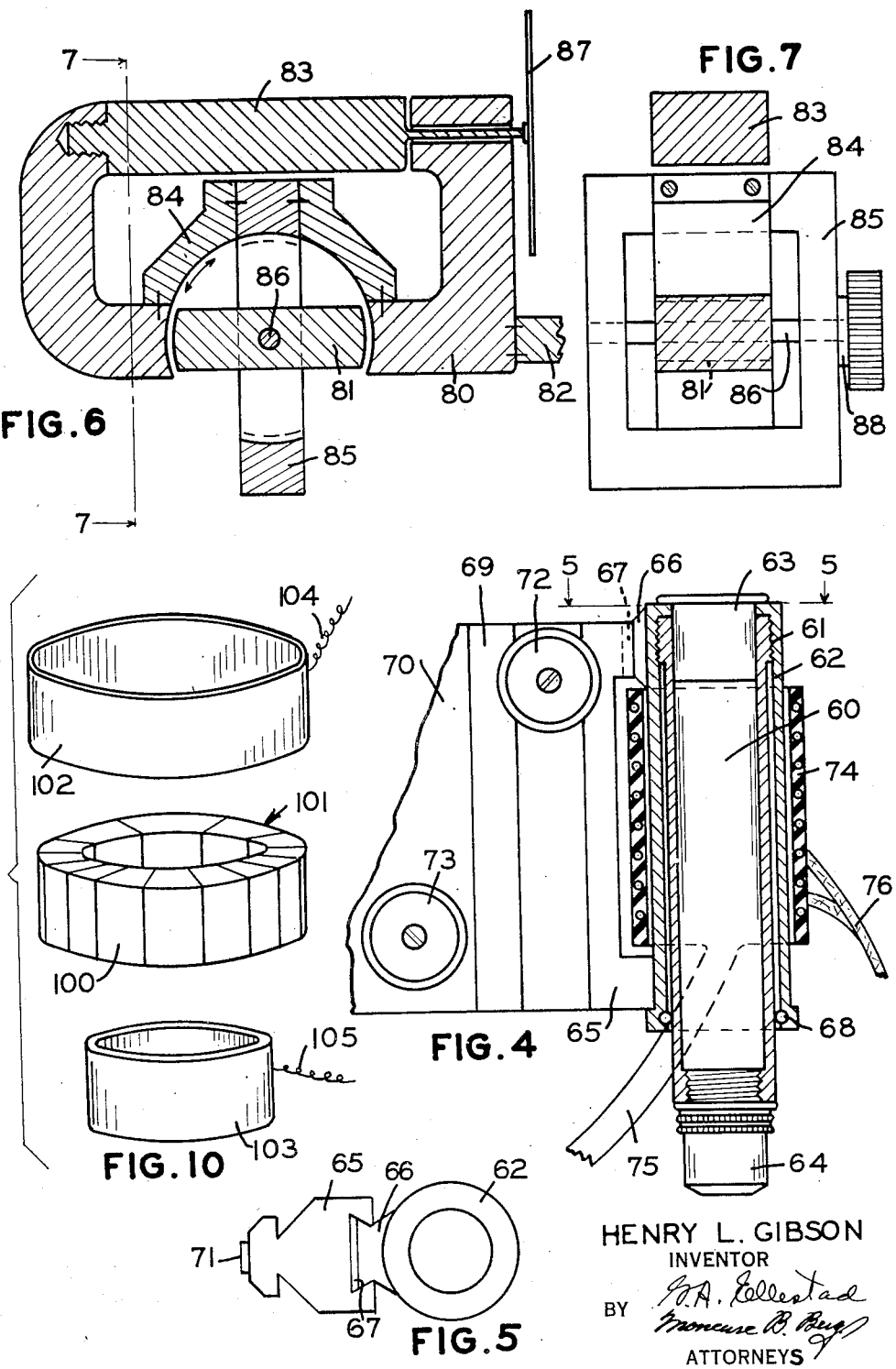
HENRY L. GIBSON
INVENTOR Patented Nov. 21, 1944

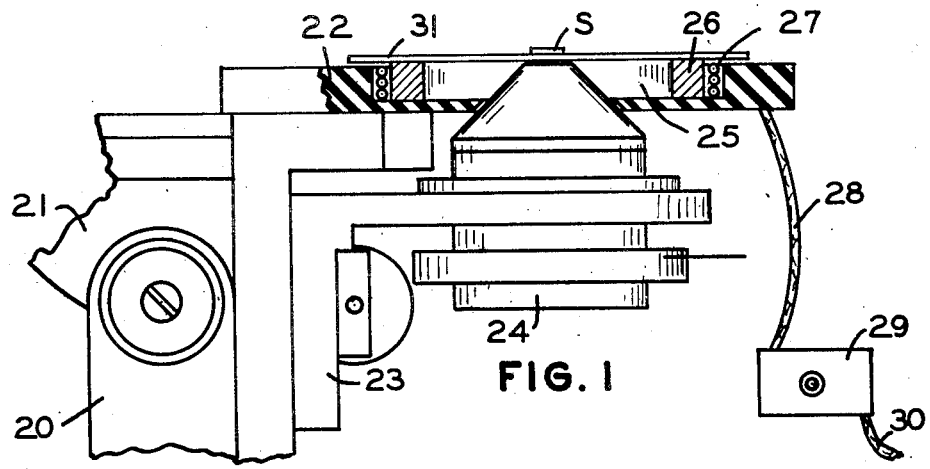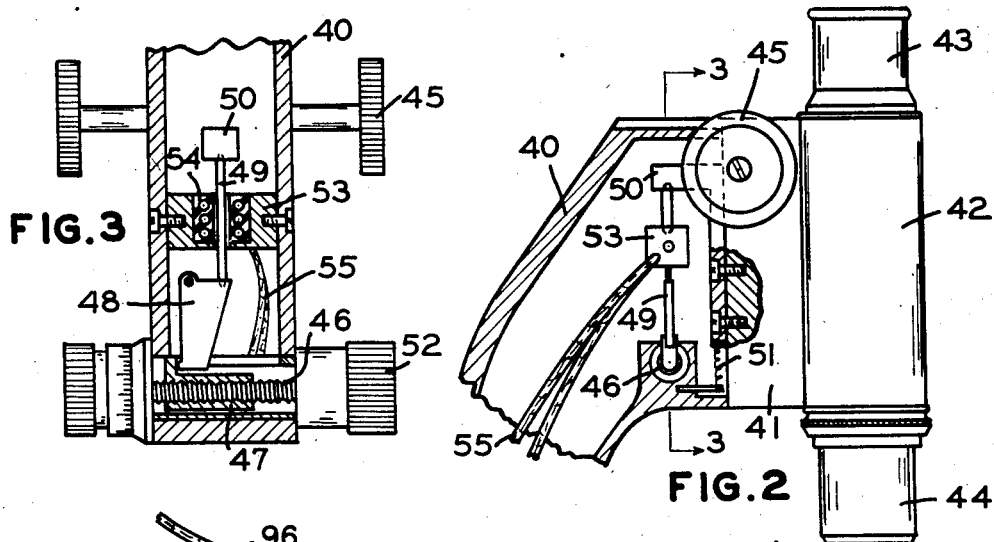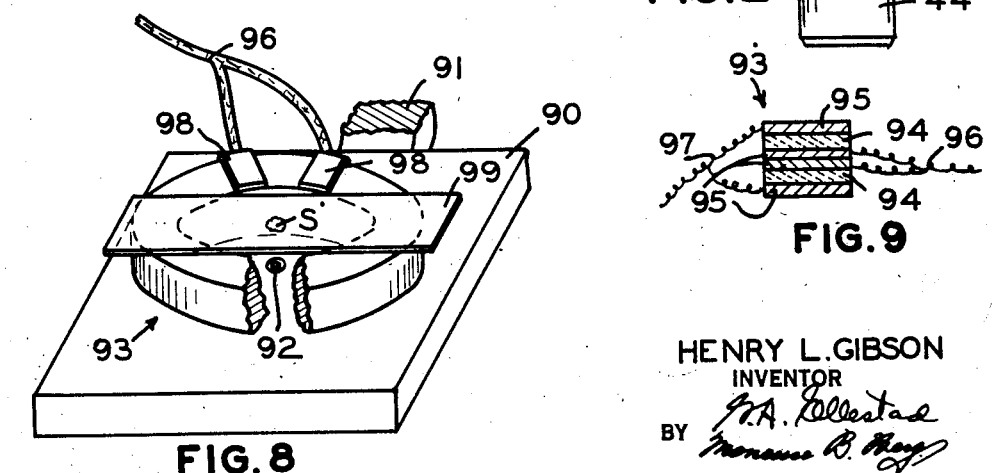

2,363,409

UNITED STATES PATENT OFFICE 2,363,409

FINE ADJUSTMENT MECHANISM

Henry L. Gibson, Rochester, N. Y., assignor to Bausch & Lomb Optical Company, Rochester, N. Y., a corporation of New York Application June 11, 1942, Serial No. 446,681

5 Claims. (Cl. 88—39)

My invention relates to fine adjustment mechanism employed to adjust a movable member to a desired position and more particularly is concerned with devices wherein the adjustment is effected through a member which is subjected to controlled dimensional changes.

An object of my invention is to provide novel adjusting mechanism of a character which permits extremely minute or hyperfine movement of an adjustable member whereby to position such member at a desired location. Another object is to devise improved fine adjustment means which in common with other adjustment mechanism is connected to a movable member in a manner to permit adjustment of such member. Yet another object is the provision of fine adjustment mechanism having an actuating member for moving and holding an adjustable member in a desired position, the actuating member being characterized by having the ability to vary its dimensions in accordance with intermolecular changes induced therein on subjecting it to a field of force of regulatable intensity. A further object of the invention is to provide a fine adjustment device which employs an actuating member formed of magnetostrictive or of piezoelectric material for adjusting the position of a movable member and for holding the movable member in adjusted position.

These and other objects and advantages reside in certain novel features of construction, arrangement and combination of parts to be hereinafter more fully set forth and claimed.

To make the invention more clearly understood, I have shown means in the accompanying drawings for carrying the same into practical effect. In the drawings, wherein like reference characters refer to like parts throughout the different views:

Figure 1 is a partial elevation of a microscope stage and substage with parts in section and illustrates schematically one form of fine adjustment means associated with the microscope stage.

Figure 2 is a side elevation of a microscope with parts thereof being broken away to schematically show another form of my fine adjustment means embodied in an optical instrument.

Figure 3 is a section taken on the line 3—3 of Figure 2.

Figure 4 is a view similar to Figure 2 and schematicaly shows still a further form of my invention embodied in a microscope.

Figure 5 is a detailed sectional view on the line 5—5 of Figure 4.

Figure 6 is a sectional view of a modified form of magnetostrictive unit which employs a permanent magnet.

Figure 7 is a view on the line 7—7 of Figure 6.

Figure 8 is a perspective view of a microscope stage with parts of the instrument being broken away and schematically illustrates still a further embodiment of my fine adjustment means.

Figure 9 is a section through a piezoelectric unit employed in Figure 8 and schematically discloses a means for wiring the unit.

Figure 10 is an expanded view of a modified form of a piezoelectric unit.

It is frequently necessary to precisely position some movable member or element with respect to a fixed reference point and to maintain it in such position as well as to very accurately adjust several movable members with respect to each other. Positioning of the member is effected by bodily movement of the same or by its tipping or its rotative movement. Common procedure carries out precision adjustments with mechanically actuated fine adjustment means. For example, one practice makes use of a travelling nut which is linked to the member to be adjusted so as to effect movement of the member in accordance with the movement of the nut. In this mechanism, the movement of the member in one direction is against the action of a spring and the position of the member when at rest is dependent upon the location of the nut in its path of travel.

Prior art adjusting means while capable of providing a fine degree of adjustment, nevertheless lack that sensitiveness which makes it possible to obtain minute shifts of position with ease and facility and without considerable manipulation of the mechanism. Moreover, the tolerances on mechanical fine adjustments now employed are such that the best of these mechanisms are capable of an accuracy of only about one micron in setting a movable member at a predetermined location.

Consideration of the almost infinitesimal magnitudes of the adjustment movements required will show the desirability of sensitive fine adjustment means. To illustrate, it is customary to expect fine adjustment of a movable member to occur within a range of five microns on either side of a reference point or plane. In addition, it is common to require adjusting movement, in this range, of as little as a fraction of a micron.

The present invention proposes to overcome these difficulties by causing a movable member to be adjusted by means of an actuating member which undergoes a change in its physical dimensions when an intermolecular change is induced in the latter upon subjecting it to a field of force, the actuating member substantially maintaining its altered form so long as the intensity of the field of force which causes the physical alteration remains substantially constant. As it is a purpose of this invention to effect immediate adjustments, the need for substantially instantaneous intermolecular changes in the actuating member is a condition which precludes the use of heat to obtain the same. This is due to the considerable time lag between the final result produced and the application of the cause for producing such result where adjustment is dependent on thermal expansions and contractions. For this reason, my inventive concept embraces the use of materials which exhibit either the phenomenon of magnetostriction or that of piezoelectricity and which develop substantially instantaneous dimensional changes when they are respectively subjected to a magnetic field and to an electric force field.

Where the fine adjustment means utilizes the phenomenon of magnetostriction, the invention depends upon the employment of a fine adjustment actuating member which is formed of a suitable ferromagnetic material as distinguished from paramagnetic and diamagnetic substances. Both of the latter, at least for the purposes of this invention, may be considered as substantially unaffected by a magnetic field. In general, the use of any magnetostrictive material is contemplated, although substances which exhibit magnetostriction to a strong degree are to be preferred. Iron, nickel and cobalt and alloys thereof are well adapted for the desired purpose. As specific examples, named by way of illustration and without limiting the scope of the invention, Invar and Stoic metal may be mentioned.

My invention is mainly concerned with dimensional changes caused by the expansion and contraction of magnetostrictive material when it is magnetized as distinguished from twisting and other effects caused under special conditions. Changes in length which are parallel to magnetization in a specified direction or which are perpendicular to this direction are known respectively as the longitudinal and transverse Joule effect and it is this effect which forms the basis for my invention. Some substances expand along a particular axis when placed in a magnetic field while a similar magnetic field causes other substances to contract along such axis. In either case, the dimensional changes are proportional to the intensity of the exciting magnetic field but may vary in magnitude for different materials. Although the magnitude of these dimensional variations are small, it should be observed that the invention is concerned with providing minute adjustments and that moreover, as will presently appear, where it is desirable, suitable construction expedients may be employed to magnify the Joule effect.

Within the inventive scope is the use of either a permanent magnet or an electromagnet for furnishing a variable field of force. Change in the dimensions of magnetostrictive material increases with the strength of the field to which the material is subjected and decreases as the field intensity is reduced. When the field intensity is held constant, the dimensions of the material may be expected to remain at a substantially constant value. In my invention, field strength is adapted to a sensitive control and can be regulated with great ease and facility to provide minute variations of intensity and can also be held at desired magnitudes. Hence, it will be appreciated that a corresponding regulation of the dimensions of the magnetostrictive material and similar regulation of the fine adjustment will be afforded.

It has been heretofore mentioned that the invention comprehends the use of piezoelectric material as the motivating force for shifting the position of a movable member. It is also contemplated to use this material in a manner similar to that described in connection with magnetostrictive substances. The phenomena known as piezoelectricity is exhibited in certain crystalline materials and results in the production of an electric charge when such a material is mechanically stressed and conversely a dimensional change along certain axes of the material when a voltage is applied to the crystal. Suitable piezoelectric substances include quartz and Rochelle salt crystals, the latter being among the most active materials of this character now known.

When piezoelectric material is excited by an electric field of force, it expands along one of its axes and contracts along another axis in accordance with the intensity of the field. When the field intensity is held constant, the dimensions of the piezoelectric material are maintained at a value which is substantially constant, this value being dependent on the magnitude of the intensity. It is to be noted that piezoelectric substances possess the ability to reverse their axes of expansion and contraction on a reversal of the direction of the applied potential. Dimensional changes in piezoelectric fine adjustment means, like dimensional changes where magnetostrictive material is employed, can also be controlled with fine precision since the intensity of the applied voltage is easily regulated and may be held at a desired value.

One application to which the invention is especially adapted resides in its use in connection with the fine focusing of optical instruments. By way of illustration and without limitation of the invention, I have shown the same in Figure 1 as applied to a conventional microscope, it being noted that in its broadest aspect, the invention comprehends the movement of any movable member and its maintenance at a desired position. The microscope comprises the usual pillar 20, body tube support arm 21, stage 22 and slidable substage assembly 23 which is movable towards and away from the stage and which carries the condenser 24.

In the form of the invention illustrated in Figure 1, it is proposed to obtain hyperfine focus of a specimen by moving the specimen with respect to the body tube of the instrument, the body tube remaining in fixed position during adjusting movement of the specimen. For this purpose, stage 22 which is formed of the usual hard rubber or other material of a paramagnetic character, is provided with a central recess 25 which surrounds the usual stage opening provided for the condenser. Recess 25 forms a seat for an actuating member comprised of a ring 26 of magnetostrictive material around which is provided a coil 27 of insulated wire. A lead cable 28 connects the coil 27 to a rheostat 29 which in turn is connected by a lead 30 to a source of electrical energy. Rheostat 29 is adapted to control the intensity of the magnetic field applied to the ring 26.

Ring 26 extends above the surface of stage 22 and provides a support for a specimen slide 31 on which is shown a specimen S. The slide 31 is illustrated as slightly separated from the condenser 24 which is adapted to extend through the stage opening to a position where the slide may be oiled to the front element of the condenser if desired. Suitable means, not shown for the sake of simplifying the drawings, may be associated with the slide 31 whereby to cause movement of the specimen S for the purpose of bringing different portions of the specimen into the field of view of the microscope.

My invention contemplates the use of magnetostrictive material which either expands or contracts when subjected to a force field. Formation of ring 26 of material which expands, such for example as iron or suitable alloys, permits a more compact design for the microscope and is generally to be preferred. The actuating means is constructed so that when its coil 27 is energized, its ring 26 will increase in thickness, assuming that the ring is formed of iron or other material which expands. This results in the specimen slide 31 and specimen S being moved towards the microscope objective located above it. When the intensity of the magnetic field is reduced by the rheostat 29, the specimen will approach the condenser 24. Use of the rheostat 29 permits control of the field intensity and hence allows the dimensional change of the ring to be arrested anywhere within the range of the field to be applied and the specimen to be located as desired within its range of movement.

The construction shown in Figure 1 makes use of a dimensional change which occurs in one direction along the longitudinal axis of the member 26 as the intensity of the applied field is increased from zero to its maximum value and also uses the dimensional change of reverse direction along the same axis which occurs when the intensity of the applied field is reduced. In operation of the adjustment means of Figure 1, the just-mentioned condition suggests the practice of partially exciting the ring 26 before attempting any adjustments of the instrument.

Thus in the use of the microscope, the ring 26 may be first partially excited by applying a magnetic field which has an intensity of about one-half the value of the maximum field intensity which it is intended to apply. In the customary manner and by the use of the usual mechanical coarse and fine adjustments provided with the instrument, the optics of the microscope are focused on the specimen in the position to which it has been moved as a result of subjecting the ring 26 to the field of medium intensity. Hyperfine adjustments of focus are then made by increasing or decreasing the intensity of the magnetic field through the rheostat control. Variations of the field intensity will cause the specimen to be located and maintained at desired positions within its range of movement.

In connection with the construction of any hyperfine adjustment means, it should be kept in mind that such devices are designed to provide extremely minute adjusting movements. This may be illustrated in connection with the focal range of a high power microscope objective, for example, with an objective having a focal length of 1.8 mm. and a numerical aperture of 1.25. It may be theoretically shown that an objective of the just described character has a focal range which approximates 0.00032 mm. This means that movement of the objective by a little more than 0.00016 mm. to either side of a position where the microscope is exactly in focus, will cause the instrument to lose its focus.

Thus, it will be appreciated that the invention is dealing with movements which can be caused by dimensional changes of as small an order as a fraction of a micron. The dimensional change which occurs in magnetostrictive material is a function of the length of the material and the intensity of the applied magnetic field. While the dimensional change per unit of length per c. g. s. unit of magnetic field is small, it will nevertheless be well understood by the art that the minute movements demanded for adjustment purposes may be effected by the use of a relatively compact or short actuating member and with a field of relatively low intensity.

Figures 2 and 3 show another embodiment of the invention wherein the usual fine adjustment mechanism associated with a microscope is itself designed to permit hyperfine adjustments by use of an actuating member which exhibits magnetostriction. This embodiment is illustrated in conjunction with a conventional microscope which comprises the support arm 40, slide block 41 which is slidably mounted on the arm 40, and the body tube 42 which is slidable on the block 41. Body tube 42 carries the usual eyepiece 43 and objective 44. Conventional rack and pinion means which are actuated from the buttons 45 provide the coarse adjustment for moving the body tube on the block 41.

Fine adjustment mechanism which operates on principles similar to the adjustment means shown in U. S. Patent 2,093,611 to H. F. Kurtz are employed to simultaneously adjust the block 41 and the body tube 42. These fine adjustment means comprise the screw 46 which extends through the arm 40 and has its ends journalled in the arm, the traveling nut 47 which is engaged with the screw, the pivoted lever 48 which is actuated through the movement of the nut 47 and the pin or actuating member 49 which operatively connects the lever 48 to the block 41. One end of member 49 is engaged in a recess in the lever 48 and its other end is engaged in a recess in a bracket 50 which is secured to the block 41. Upward movement of the block 41 is against the action of the usual spring 51. Operating buttons 52 on the ends of the screw 46 allow it to be rotated to effect the desired adjustment of the position of the body tube and its optics.

The fine adjustment mechanism so far described in connection with Figures 2 and 3 has been of well known design. The improvement therein consists of forming the actuating member 49 of magnetostrictive material which either expands or contracts in a longitudinal direction when subjected to a suitable magnetic field of force and in mounting a coil around the member 49 so that a suitable field may be provided. For this purpose, I make use of a support 53 which is mounted within the arm 40 and which is adapted to have the member 49 extend therethrough. A central recess within the support 53 permits an insulated coil 54 to be seated in the support in surrounding relation to the member 49. It is to be noted that the actuating member 49 is freely slidable through the support and the coil. The support 53 is formed of material of a paramagnetic nature and parts of the instrument adjacent thereto such as the support arm 40, slide block 41, lever 48 and bracket 50, may, if desired, be constructed of similar material.

Lead wires 55 which extend through the arm 40 connect the coil 54 to a rheostat so that the energy supplied the coil may be controlled whereby to vary the intensity of the magnetic field developed by the coil. Operation of the instrument of Figures 2 and 3 is substantially similar to that for the form of the invention heretofore described, in that, the mechanical coarse and fine adjustment means are operated to focus the instrument by suitably positioning the body tube, after which hyperfine adjustments are made by creating a magnetic field, around the member 49, of an intensity which will permit the desired movement of the body tube. As will be apparent, longitudinal expansion of the member 49 will cause the body tube and the optics thereof to be elevated while contraction of the member 49 will lower the body tube and the optics. In this form of the invention, it is to be noted that the hyperfine adjustments result in bodily movement of the optics with respect to the specimen rather than the movement of the specimen with respect to the optics.

Figure 4 shows another form of the invention which employs magnetostrictive material to carry out hyperfine adjustment of a microscope. In this instance, the hyperfine adjustment is effected by moving the body tube, objective and eyepiece with respect to the specimen. Means whereby to magnify the results obtained from magnetostriction are also illustrated in this figure of the drawings.

The embodiment of the invention in Figure 4 is also shown in connection with a microscope having a body tube 60, the upper end of which, as indicated at 61, is threaded or otherwise suitably secured within an outer auxiliary tube 62. An eyepiece 63 is carried by the body tube 60 at its upper end and its lower end may be threaded as shown to support an objective 64. The outer tube 62 has its lower end fixedly secured to an extension arm on the lower end of a slide block 65 by any suitable fastening means such as by screws or by being brazed thereto. The upper end of the outer tube 62 carries a lug 66 which is secured thereto by fastening means of a character similar to those just described. Lug 66 is slidable in a guideway 67 formed in an upper extension arm on the slide block 65.

By reason of this construction, it will be apparent that any longitudinal movement of the block 65 will cause similar movement of the tubes 60 and 62 which it carries. Also it will be apparent that longitudinal expansion and contraction of the tubes 60 and 62 is permitted because of the floating connection between the upper end of the tubes and the slide block 65. It is to be noted that the inner tube 60 is maintained in axial alignment with respect to the outer tube 62 by suitable anti-friction holding means such as the series of balls 68 carried in a recess in the lower end of outer tube 62 to contact the adjacent surface of the tube 60. The ball bearing support means 68 facilitates relative movement between the concentric tubes 60 and 62.

Slide block 65 is in turn slidable on a second block 69 which latter is slidably carried by the microscope arm 70. A rack 71 on the block 65 is adapted to be engaged by a pinion provided with the usual mechanical coarse adjustment means so that block 65 may be moved with respect to block 69 on rotation of the operating button 72. Mechanical fine adjustment means of a conventional character and which are actuated through the operating button 73 are employed to carry out the usual fine adjustment of the optics of the microscope.

It is to be noted that the concentric tubes 60 and 62 are secured together at one end while their opposite ends are free to move with respect to each other and also that the lower end of the outer tube is fixed to a support while its upper end is free to move with respect to this support. This expedient permits magnification of the longitudinal movement of the objective over that obtained when a single tube is subjected to a magnetic field, assuming that one of the tubes 60 and 62 is made of material, such as nickel, which contracts and that the other tube is made of material, such as iron, which expands under the influence of a magnetic field.

For example, if tube 62 contracts on the application of a magnetic field, its upper end will move downwardly while its lower end, which is fixed to the block 65, will remain substantially stationary. This movement will also cause the tube 60, which is carried by the tube 62, to also be lowered by a like amount and consequently the eyepiece 63 and objective 64 will be moved towards the specimen. At the same time, the magnetic field is also influencing the inner tube 60 which will expand. However, tube 60 is fixed to tube 62 at 61 so that expanding movement of the inner tube will take place in a downward direction to cause the objective 64 to be lowered by a further amount.

As a result of such construction, the objective 64 will be moved by an amount which is the sum of the change in the longitudinal dimension of the tube 60 and the tube 62. Obviously, the dimensional change may be further magnified by adding extra tubes to the magnetostrictive unit in a manner such that alternate tubes expand while any tube adjacent an expanding tube is of the type which contracts under the influence of a magnetic field. Where more than two tubes are employed, any tube which is located intermediately of the innermost and outermost tubes is connected at one end to a tube next adjacent to one side of it and is connected at its opposite end to the tube next adjacent to the other side of it.

This principle for magnifying the effect of magnetostriction may be readily applied to all other magnetostrictive devices herein described on slight structural modification of the same and its use in connection therewith is contemplated as a part of my invention. Moreover, the invention comprehends the use of magnetostrictive elements other than tubes, for example, plates, to obtain an enhanced displacement of a movable member.

The means for applying a magnetic field to the tubes 60 and 62 comprises a suitably insulated electric coil 74 which surrounds the outer tube 62. Coil 74 may be wound around the outer tube 74 but preferably is wound on a suitable core as shown and has one end of a support arm 75 engaged to the core. The other end of the support arm 74 is adapted to be secured to the microscope arm 70 or to the stage of the instrument. This construction permits the coil 74 to be mounted without adding its weight to the mechanical fine adjustment means. Instead of a single arm 75, several support members may be employed for mounting the coil 74. A lead cable 76 is adapted to connect coil 74, through a rheostat, to a source of electric energy.

Operation of the form of the invention of Figures 4 and 5 is substantially similar to that of the embodiments of the invention heretofore described. The microscope is focused by suitable rotation of the buttons 72 and 73 to cause the mechanical coarse and fine adjustment mechanisms to adjust the optics of the instrument with respect to the specimen. Hyperfine adjustment is made on application of a magnetic field to the magnetostrictive tube elements 60 and 62 to cause minute movement of the body tube 60 and hence movement of the objective 64 carried thereby. As in the other forms of the invention, the eyepiece 63, objective 64, lug connection 66 and blocks 65 and 69 may be made of paramagnetic material such as brass.

Changes in spacing between the objectives 64 and the eyepiece 63 caused by hyperfine adjustment will not impair the successful operation of the instrument as will be well understood by the art, which under one practice moves the objective relative to the eyepiece to effect the usual fine focusing.

While a current of relatively small magnitude is employed to excite the field coil around a magnetostrictive unit with the result that such coil remains relatively cool, in some instances it may be desirable to eliminate possible thermal expansion effects where a magnetostrictive unit is employed. For example, undesirable longitudinal separation of concentric tubes, due to possible heat exchange from an electric coil or other heat developing device or even from the surrounding atmosphere, may be offset by suitable selection of tube lengths in the case where concentric tubes of unequal coefficients of thermal expansion are employed.

The coefficients of thermal expansion for iron and nickel are roughly in the ratio of 10 to 12. Thus, if iron and nickel concentric tubes are employed, by giving the iron tube a length of approximately 12 units and the nickel tube a length of approximately 10 units, the effects of thermal expansion would be approximately equal for each tube and would introduce substantially no separation between the unjoined ends of the tubes. For magnetostrictive units made from only one element undergoing change in dimensions, the effects of thermal expansion can be minimized by utilizing for this element a metal such as Invar or Stoic metal which evidences magnetostrictive effects but substantially no thermal effects.

In Figures 6 and 7, I have illustrated a magnetostrictive device which employs a permanent magnet mounted in a manner to permit the intensity of the magnetic field applied to a magnetostrictive actutating member to be varied. As shown, I employ a two piece actuating member 80 formed of magnetostrictive material and mount a suitably strong permanent magnet 81 between the ends thereof. One section of the member 80 is fixed to a support 82 of paramagnetic material, such as brass, by screws or other suitable fastening means. A second actuating member 83, also of magnetostrictive material but formed in one piece, is secured to the other end of the member 80 by being screwed or otherwise affixed thereto. The members 80 and 83 provide a magnetostrictive unit which is approximately rectangular, the member 83 forming one of the long sides and the other long side of the rectangle being formed by the part of the member 80 which has a break therein to permit mounting of the magnet 81. The two short sides of the rectangle are provided by the bent up ends of the member 80.

This construction leaves the central part of the rectangle open and allows the two sections of the member 80 to be secured together in a manner to provide the break between them for the magnet 81. The connecting means comprises two coupling brackets 84 of brass or other paramagnetic material. These brackets also support an iron keeper yoke 85, which latter is adapted to carry the magnet 81. The lower end of each bracket 84 is fastened to a section of the member 80 by suitable means, not shown, such for example as screws, while the upper end of each bracket is similarly fastened to the keeper yoke 85. Magnet 81 is fixed to a shaft 86, which latter is journalled between the sides of the yoke 85. An operating button on the end of the shaft 86 facilitates its rotation so as to permit desired orientation of the magnet 81.

Magnet 81 is a bar magnet and when in the full line position of Figure 6 is delivering its maximum flux through the actuating members of the magnetostrictive unit. On the other hand, when magnet 81 is at right angles to the full line position of Figure 6, the flux is diverted through the keeper yoke 85 and the members 80 and 83 are substantially uninfluenced by the magnetic field. The flux which effects the magnetostrictive unit may obviously be selectively varied by orienting the magnet 81 at desired locations between the extreme positions just described. Any conventional means may be employed for maintaining the magnet 81 at desired orientations, one such means being indicated at 88 as composed of a suitable friction washer construction designed to accomplish this purpose.

Variation in the intensity of the applied field will, of course, cause variation in the dimensions of the actuating members 80 and 83. Hence, a member which is secured to the free end of the actuating member 83 will be bodily moved to a position in accordance with the intensity of the applied magnetic field. The member 87 may be a mirror which needs precise adjustment as, for example, a mirror in an interferometer. Structure like part of Figure 6 is also adapted for tipping an optical element or a plate or other device which is supported at a plurality of points, for example, on a three point support, and allows the same to be accurately levelled or inclined at some desired angle. Other uses found for the unit of Figure 6 resides in its ability to adjust some pivoted member abount its pivot or to rotate a rotatable member.

It is important to note that the structure of Figure 6 provides means for enhancing the usual magnetostrictive effect. This is made possible by forming actuating member 80 of material, such as iron, which expands when a magnetic field is applied thereto and by forming the actuating member 83 of material, such as nickel, which contracts under like conditions.

Under such circumstances, when the unit is subjected to the full flux developed by the magnet, the left end of actuating member 80 will be extended since its right end cannot expand against the fixed support 82. This expansion of the member 80 will cause movement of the actuating member 83 to the left and similar bodily movement of the mirror 87. At the same time, actuating member 83 is contracting. The left end of the member 83 is fixed but its right end is free so that on contraction, the free end of this member moves to the left thereby increasing the movement of the mirror 87 in that direction. As the field applied to the unit of Figure 6 is decreased by rotating the magnet 81, the mirror 87 will be moved to the right until the magnet reaches its dotted line position when movement of the mirror ceases. Rotation of the magnet towards its full line position reverses the direction of the movement of the mirror. When the permanent magnet is oriented in any location between its full line and its dotted line positions of Figure 6, the mirror 87 is caused to assume a position in accordance with the intensity of the magnetic field which is applied to the magnetostrictive unit. Suitable means 88 are employed, as already noted, to retain the magnet 81 at any angle of rotation so that the mirror 87 can likewise be maintained in desired position between the limits of its travel.

As heretofore mentioned, my invention intends to use piezoelectric materials as well as those which exhibit magnetostriction in providing hyperfine adjusting means. An embodiment which permits the attainment of this object of the invention is disclosed in Figure 8 in connection with the stage 90 of a customary microscope having the usual support arm 91. The stage 90 has the conventional central opening to permit illumination of the specimen by a substage condenser adapted to be mounted below the stage, the front lens 92 of such a condenser appearing through this opening.

The property of piezoelectric substances to expand and contract along axes at right angles to each other on the application of an electric potential to such substances and their ability to reverse the direction of these dimensional changes on the reversal of the direction of the applied potential is utilized to provide the piezoelectric unit 93 formed of a plurality of substantially similar annular shaped plates or rings 94 of piezoelectric material. A piezoelectric unit of this character is illustrated in Figures 8 and 9, and comprises a plurality of rings 94 which are cut from a piezoelectric crystal, such as quartz or Rochelle salt, to expand and contract along axes which are perpendicular and parallel to the faces or ends of the rings. Each ring 94 is covered with tinfoil to provide an electrode 95 thereon and the rings with the electrodes attached thereto are placed in face to face contact with each other in such manner that they expand and contract along similar axes when they are similarly polarized. The ring elements of the unit are held together by suitable cement.

The unit 93 is adapted to be subjected to an electric force field by coupling it through lead wires 96 and 97 to a source of electric energy, suitable means for controlling the intensity and the direction of the force so applied being interposed between the unit and the electric supply source. These control means, while not shown, are of any well known construction and may utilize the principles of the Wheatstone bridge to permit a reversible potential of variable intensity to be applied to the unit 93. Suitable metal clips 98 similar to those set forth in U. S. Patent 1,803,275 to C. B. Sawyer may be suitably employed for the purpose of connecting the leads 96 and 97 to the unit 93.

Preferably, the piezoelectric unit is formed of a plurality of rings as this practice gives a greater piezoelectric effect or dimensional change than that obtained in a unit made of a single ring of a thickness which equals the sum of the thicknesses of the several rings of the multi-ring unit. Piezoelectric units such as described as well as the wiring therefor and the control means for varying the intensity and the direction of the applied potential are well known to the art and need no detailed description.

When used with a microscope, the piezoelectric unit 93 is seated on the stage 90 to surround the stage opening. Where the stage is formed of a material which is an electric conductor rather than the usual hard rubber, suitably insulated seats are provided on the stage for the unit 93. A specimen slide 99 is adapted to be supported on the unit 93 so that the specimen S' thereon will be located over the stage opening.

Unit 93 is of substantially uniform thickness and is adapted to be seated on the stage 90 so that it supports the specimen slide 99 in a plane which is substantially parallel to the surface of the stage. For this purpose, suitable depressions, not shown, may be formed in the stage surface to receive the clips 98. These depressions allow the lower face of the unit 93 to contact the stage and may be so constructed as to provide means which assist in locating and retaining the unit in its working position. If desired, the stage 90 may be formed with a recess similar to the recess 25 in the stage of Figure 1. Where the latter construction is followed, depressions for clips 98 can be made in the bottom of such recess.

Hyperfine adjustments are made following the usual mechanical coarse and fine adjustment of the instrument by moving slide 99 and its specimen towards and away from the microscope objective in accordance with the intensity and the direction of the potential applied to the unit 93. When the desired hyperfine adjustment is effected, the specimen is maintained in its adjusted position on continued application of the potential used in moving it to this position.

Another type of piezoelectric unit which may be conveniently used, for example, on a microscope stage in place of the unit 93, is schematically illustrated in Figure 10 wherein the parts of the unit are shown in an expanded view. As therein shown, the unit employs a plurality of crystal segments 100 which exhibit piezoelectric effects and which are of such shape that they may be placed together to form the ring 101. Any conventional means are employed for holding the segments together. Each segment 100 is cut from a piezoelectric crystal so that its mechanical motion is developed along the longitudinal and transverse axes of the segment when a potential is applied thereto by the use of electrodes which contact the cylindrical surfaces thereof. Thus, when the assembled ring 101 has one of its ends seated on a substantially flat support surface, as a stage, application of a suitable electric potential to the electrodes will cause the segments to expand or contract in a direction which is substantially perpendicular to the stage surface.

The segments 100 are of substantially similar dimensions to exhibit substantially similar piezoelectric effects when subjected to similar potentials, the segments being oriented so that for a given potential, mechanical motion in similar directions takes place in each segment. Means for applying the potential makes use of an outer electrode 102 and an inner electrode 103. These electrodes are cylindrical in shape and contact the curved or cylindrical peripheries of the ring 101. Electrodes 102 and 103 may be of tinfoil or other suitable substance and may be cemented to the ring 101. Lead wires 104 and 105 con-